US011194978B2

(12) United States Patent
Suko et al.

(10) Patent No.: US 11,194,978 B2
(45) Date of Patent: Dec. 7, 2021

(54) COMBINED RADIO FREQUENCY IDENTIFICATION (RFID)-BASED ASSET MANAGEMENT AND COMPONENT AUTHENTICATION

(71) Applicants: Scott K. Suko, Dayton, MD (US);
Diana S. Hage, Great Falls, VA (US);
Brian J. Griffiths, Laurel, MD (US);
Parrish E. Ralston, Baltimore, MD (US)

(72) Inventors: Scott K. Suko, Dayton, MD (US);
Diana S. Hage, Great Falls, VA (US);
Brian J. Griffiths, Laurel, MD (US);
Parrish E. Ralston, Baltimore, MD (US)

(73) Assignees: Northrop Grumman Systems Corporation, Falls Church, VA (US);
RFID Global Solution, Inc., Reston, VA (US)

( * ) Notice: Subject to any disclaimer, the term of this patent is extended or adjusted under 35 U.S.C. 154(b) by 20 days.

(21) Appl. No.: 16/509,869

(22) Filed: Jul. 12, 2019

(65) Prior Publication Data
US 2021/0012073 A1 Jan. 14, 2021

(51) Int. Cl.
*G06K 7/10* (2006.01)
*G06K 19/07* (2006.01)
(Continued)

(52) U.S. Cl.
CPC ..... *G06K 7/10366* (2013.01); *G06K 19/0723* (2013.01); *G06Q 10/087* (2013.01); *H04L 9/3271* (2013.01); *G06F 2213/0016* (2013.01)

(58) Field of Classification Search
CPC .................. G06Q 10/087; G06Q 10/0875
(Continued)

(56) References Cited

U.S. PATENT DOCUMENTS 7,840,803 B2  11/2010  Clarke et al.
8,081,079 B1  12/2011  Camarota
(Continued)

OTHER PUBLICATIONS

Jin et al., Secure and Efficient Initialization and Authentication Protocols for SHIELD, Jun. 15, 2016, pp. 1-34.
(Continued)

*Primary Examiner* — Edwyn Labaze
(74) *Attorney, Agent, or Firm* — Edell, Shapiro & Finnan, LLC

(57) ABSTRACT

An apparatus and method for combined radio frequency identification (RFID)-based asset management and component authentication are provided. The apparatus comprises a plurality of components to be authenticated, a memory configured to store inventory data, a plurality of root-of-trust (RoT) integrated circuits (ICs), a wired communication bus, and a radio frequency identification (RFID) relay tag. Each RoT IC is mechanically coupled to a corresponding one of the plurality of components and configured to generate authentication data based on a unique key generated for authenticating the corresponding component. The RFID relay tag is connected to each of the RoT ICs via the wired communication bus and is configured to communicate with each of the RoT ICs via the wired communication bus and pass the authentication data and the inventory data to an RFID reader via a radio frequency signal to facilitate authentication of components and inventory management.

21 Claims, 9 Drawing Sheets

(51) Int. Cl.
*G06Q 10/08* (2012.01)
*H04L 9/32* (2006.01)

(58) Field of Classification Search
USPC .................................... 235/385, 375, 487
See application file for complete search history.

(56) References Cited

U.S. PATENT DOCUMENTS

| | | | |
|---|---|---|---|
| 8,938,615 B2 | 1/2015 | Neill et al. | |
| 9,256,881 B2 | 2/2016 | Engels et al. | |
| 9,471,821 B2 | 10/2016 | Mats et al. | |
| 9,594,998 B2 | 3/2017 | Butler et al. | |
| 9,742,563 B2 | 8/2017 | Gotze et al. | |
| 9,842,234 B2 | 12/2017 | Jung et al. | |
| 10,060,973 B1 | 8/2018 | Helinski et al. | |
| 10,740,466 B1* | 8/2020 | Bshara .................... | G06F 21/44 |
| 2004/0217867 A1* | 11/2004 | Bridgelall ............ | G08B 13/2474 |
| | | | 340/572.8 |
| 2007/0200685 A1* | 8/2007 | Nagai .................. | G06K 7/0008 |
| | | | 340/10.51 |
| 2008/0024268 A1 | 1/2008 | Wong et al. | |
| 2010/0277280 A1* | 11/2010 | Burkart .................... | H04Q 9/00 |
| | | | 340/10.1 |
| 2014/0286491 A1 | 9/2014 | Atherton | |
| 2015/0234751 A1* | 8/2015 | Van Der Sluis ...... | H04L 9/3278 |
| | | | 713/193 |
| 2017/0126505 A1 | 5/2017 | Cencini et al. | |
| 2017/0215075 A1 | 7/2017 | Debates et al. | |
| 2018/0077537 A1* | 3/2018 | Zhou ...................... | H04W 4/80 |
| 2020/0076604 A1* | 3/2020 | Argones Rua ......... | G06F 21/32 |

OTHER PUBLICATIONS

Leef, Supply Chain Hardware Integrity for Electronics Defense (SHIELD), Software and Supply Chain Assurance Winter Forum 2018, Dec. 18, 2018, DARPA, pp. 1-30.

Suko, DARPA SHIELD Improves Supply Chain Traceability and Deters Counterfeiting, RFID Journal Live, 14th Annual Conference and Exhibition, May 2-5, 2016, Orlando Florida, 21 Pages.

Donno et al., Enabling Self-Powered Autonomous Wireless Sensors with New-Generation I2C-RFID Chips, Jun. 2-7, 2013, IEEE MTT-S International Microwave Symposium Digest, pp. 1-4.

Tan et al., An RFID to I2C Bridge IC with Supply Interference Reduction for Flexible RFID Sensor Applications, Apr. 2-4, 2019 IEEE International Conference on RFID (RFID), pp. 1-6.

Ralston et al.,"Defeating Counterfeiters with Microscopic Dielets Embedded in Electronic Components," Computer, vol. 49, No. 08, pp. 18-26, IEEE Computer Society, 2016.

Mark Roberti, Cisco Tracks IT Assets Via RFID, RFID Journal The World's RFID Authority, Jan. 18, 2012, 4 pages.

Kerry Bernstein, Shield Supply Chain Assurance Technology, The Electronics Resurgence Initiative Summit, San Francisco, CA, Jul. 23-25, 2018, 28 pages.

* cited by examiner

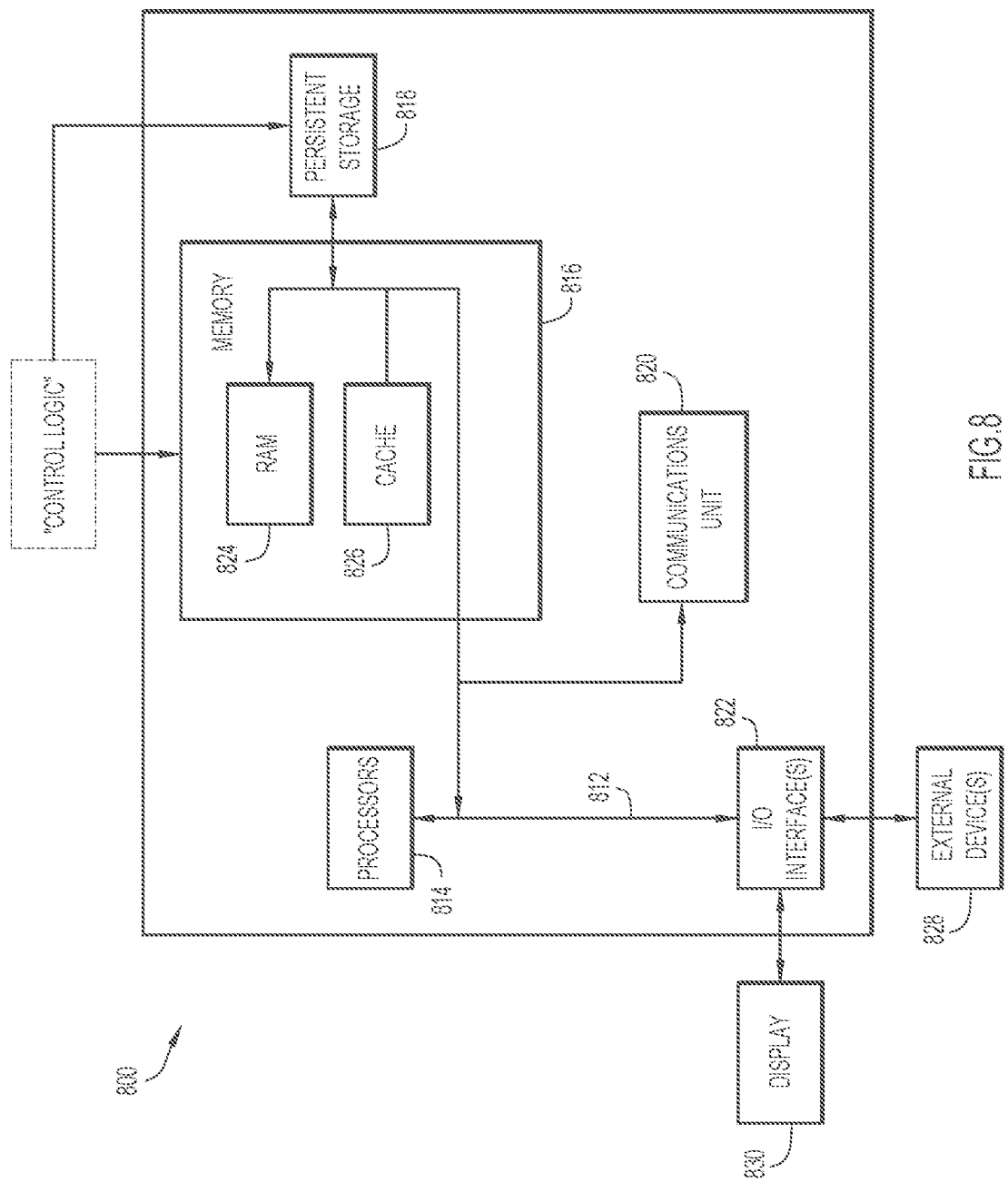

COMBINED RADIO FREQUENCY IDENTIFICATION (RFID)-BASED ASSET MANAGEMENT AND COMPONENT AUTHENTICATION

STATEMENT OF GOVERNMENTAL INTEREST

This invention was made with United States Government support under contract no. HR0011-15-C-003 awarded by the United States Government. The United States Government has certain rights in the invention.

TECHNICAL FIELD

The present disclosure relates generally to radio frequency identification (RFID)-based asset management and component authentication.

BACKGROUND

Conventional asset/inventory management systems may use RFID technology to track, identify, locate, and/or monitor assets. RFID tags may be affixed to the assets that are to be managed, and an RFID reader may be used to activate the RFID tags so that the RFID reader may read data from and/or write data to the RFID tag. Some of the conventional systems, however, provide no information about components of the asset, while others require that the asset be powered on and operating in order for information about the components to be provided.

At the same time, counterfeit electronics continue to be a problem for manufacturers in various industries. Contributing to this problem has been the globalization of electronic component or integrated circuit (IC) manufacturing. The presence of counterfeit ICs in the supply chain may not only cause a variety of concerns and/or repercussions regarding the performance, reliability, and/or quality of electronic components, but also may pose potential data security issues. For example, datacenters, telecommunications hubs, and other electronic infrastructure may need to be trusted, and one aspect of a trustworthy datacenter is having an asset/inventory management system, an auditable inventory control plan, and/or the like. Some conventional counterfeit integrated circuit detection systems and methods are difficult to use after the integrated circuit has been integrated into or embedded within an electronic device (assembly) and may require the electronic device to be de-lidded so that a probe may be held in near contact with the detection system.

SUMMARY

In accordance with a first aspect, an apparatus is provided. The apparatus comprises a plurality of components to be authenticated, a memory configured to store inventory data, a plurality of root-of-trust (RoT) integrated circuits (ICs), a wired communication bus, and a radio frequency identification (RFID) relay tag. Each RoT IC is mechanically coupled to a corresponding one of the plurality of components. Each RoT IC is configured to generate authentication data based on a unique key generated for authenticating the corresponding component. The RFID relay tag is connected to each of the RoT ICs via the wired communication bus. The RFID relay tag is configured to communicate with each of the root-of-trust integrated circuits via the wired communication bus and pass the authentication data and the inventory data to an RFID reader via a radio frequency signal to facilitate authentication of components and inventory management.

In accordance with a second aspect, a method is provided. The method includes receiving by a radio frequency identification (RFID) relay tag of an electronic device a request to an RFID reader for component authentication and electronic device management data, wherein a component of the electronic device is packaged with a root-of-trust (RoT) integrated circuit (IC) that is connected to the RFID relay tag via a wired communication bus, receiving by the RFID relay tag from the RFID reader via a first RF signal an encrypted challenge for the RoT IC, providing by the RFID relay tag via the wired communication bus the encrypted challenge to the RoT IC, receiving by the RFID relay tag from the RoT IC via the wired communication bus an encrypted response generated by the RoT IC, providing the encrypted response via a second RF signal to the RFID reader for authentication; and providing electronic device management data to the RFID reader for electronic device management.

BRIEF DESCRIPTION OF THE DRAWINGS

Example embodiments of the invention are described herein with reference to the accompanying drawing figures, in which like reference numerals in the various figures are utilized to designate like components, and in which:

FIG. 8 is a schematic diagram showing a computing system configured to implement the techniques described herein, according to an example embodiment.

DESCRIPTION OF EXAMPLE EMBODIMENTS

The present disclosure is directed to apparatus and methods for combined radio frequency identification (RFID)-based asset management and component authentication. As described in greater detail below, example embodiments enable combined inventory management of electronic devices and authentication of components of the electronic devices. Example embodiments described herein provide an extension of conventional asset management systems, allowing for component level authentication to be provided (e.g., concurrently) with or as part of asset management audits. In an example embodiment, industry standard RFID tags and readers are employed, which may allow for faster and/or easier industry adoption of the example embodiment.

Figure 1A:
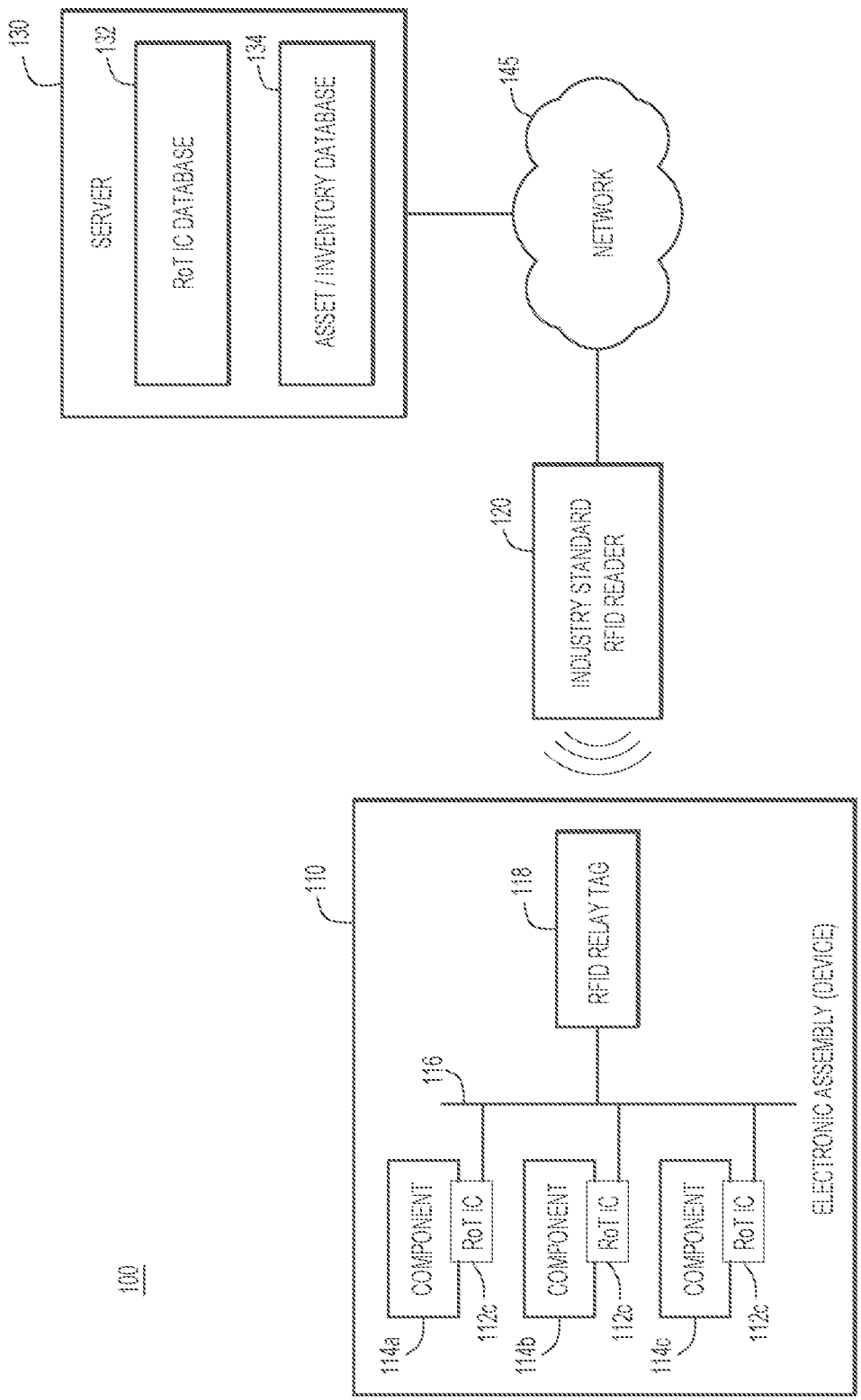
FIG. 1A is a high-level block diagram of a system for combined radio frequency identification (RFID)-based asset management and component authentication, according to an example embodiment.

FIG. 1A is a high-level block diagram of a system 100 for combined RFID-based asset management and component authentication. System 100 includes one or more electronic devices (apparatuses) 110, an RFID reader 120, and an asset management/component authentication server 130. System 100 may allow for management of the electronic device 110 and authentication of components of the electronic device 110, in a single RFID pass/scan. Further, the system 100 may allow for components of the electronic device 110 to be authenticated at their final point of use (post supply-chain use), rather than, for example, just upstream in the supply chain.

In the example embodiment shown in FIG. 1A, the asset management/component authentication server 130 is configured to provide an asset management/component authentication service that interacts with the RFID reader 120, which in turn interacts with an RFID relay tag 118 that is communicatively coupled to a plurality of root-of-trust integrated circuits 112a-112c associated respectively with components 114a-114c of the electronic device 110, so as to enable verification of the authenticity of each of the components 114a-114c of the electronic device 110 as part of an RFID-based inventory management audit. The RFID relay tag 118 may be attached to the electronic device 110 in such a way that allows for easy access by the RFID reader 120. For example, the RFID relay tag 118 may be attached near a periphery of the electronic device 110.

Figure 1B:
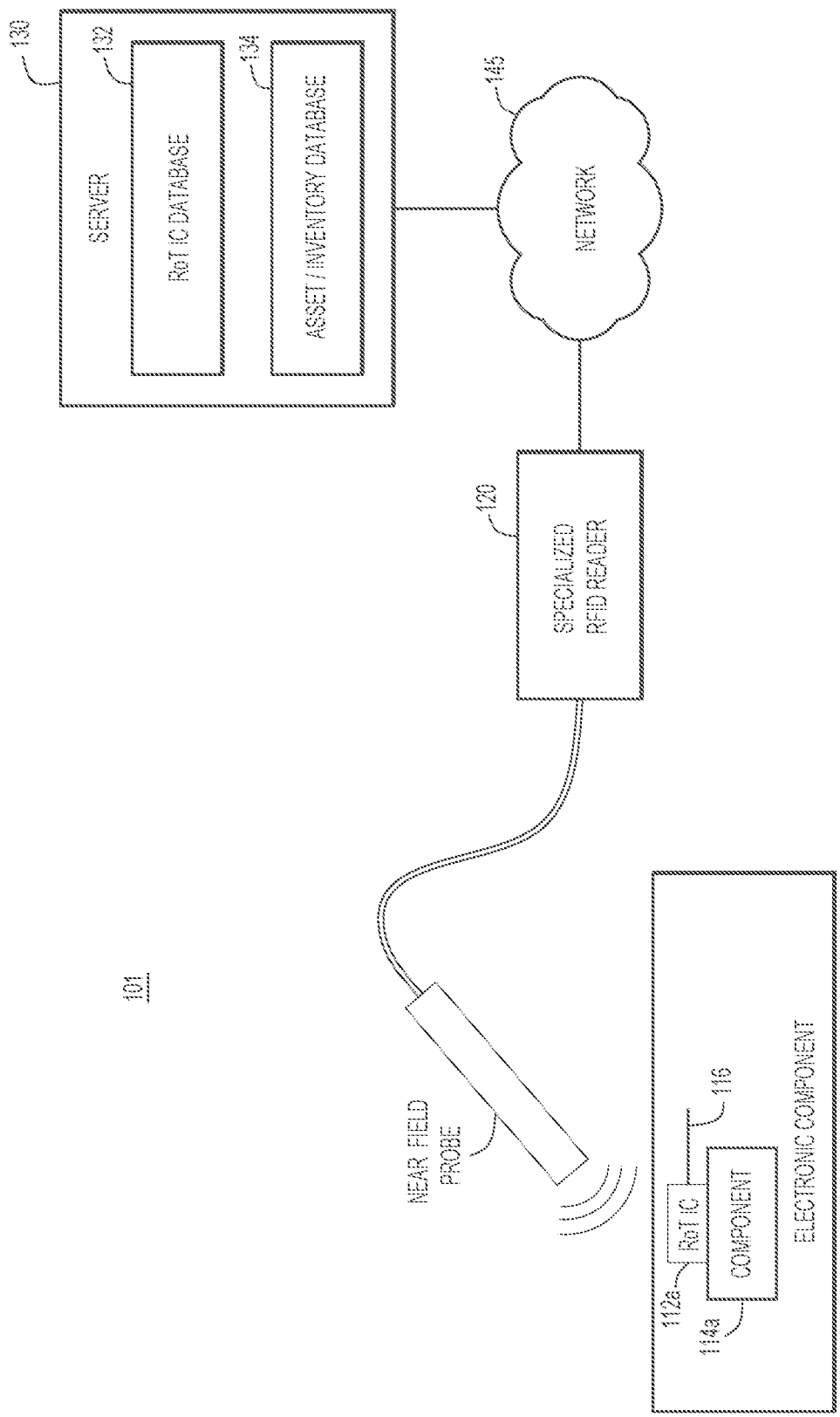
FIG. 1B is a high-level block diagram of system for RFID-based component authentication, according to an example embodiment.

The electronic device 110, the RFID reader 120, and the asset management/component authentication server 130 may communicate directly or indirectly over one or more wired or wireless communication protocols and/or over a network 145. For example, the electronic device 110 may connect to the RFID reader 120 via an RF channel and may communicate with the RFID reader 120 over a wireless communication protocol, such as Near Field Communication (NFC), Ultra High Frequency (UHF) standard, High Frequency (HF) standard, etc. Examples of types of networks that can be utilized within the system depicted in FIG. 1 include, without limitation, any one or more of local or wide area networks, Internet Protocol (IP) networks such as intranet or internet networks, telephone networks (e.g., public switch telephone networks), wireless or mobile phone or cellular networks, and any suitable combinations thereof.

Generally, the electronic device 110 is any device that is to be managed, tracked, located, etc. as part of an asset/inventory management system and generally includes one or more components that are to be authenticated. A plurality of root-of-trust (RoT) integrated circuits (ICs) (RoT ICs) are associated with/mechanically coupled to (e.g., integrated with) the one or more components, and are communicatively coupled to an RFID relay tag via a wired communication bus. In an example embodiment, the plurality of RoT ICs are integrated within electronic components (e.g., ICs and/or IC packages) that are part of (e.g., embedded within) an electronic assembly of the electronic device 110, and the RoT ICs are used to authenticate the electronic components. For example, each RoT IC of the plurality of RoT ICs may be integrated within a respective IC or IC package to enable authentication of the RoT IC as the particular RoT IC that it is claiming to be and to facilitate tamper or counterfeit detection of the IC and/or IC packages within which the RoT IC is integrated.

In the example embodiment shown in FIG. 1A, the electronic device 110 includes RoT ICs 112a, 112b, and 112c, components 114a, 114b, and 114c, a wired communication bus 116, and an RFID relay tag 118. As shown, each of the RoT ICs 112a-112c is connected to the wired communication bus 116. The RFID relay tag 118 is also connected to the wired communication bus 116. The RFID relay tag 118 may communicate with the RoT ICs 112a-112c via the wired communication bus 116. In an example embodiment, the wired communication bus 116 is an inter-integrated circuit ($I^2C$) bus, and the RoT ICs 112a-112c and the RFID relay tag 118 have $I^2C$ interfaces, although an $I^2C$ bus is just an example type of wired communication bus and other types of wired communication buses may be used. Examples of RFID relay tags that may be used are shown and/or described in "Enabling Self-Powered Autonomous Wireless Sensors with New-Generation $I^2C$-RFID Chips" by D. De Donno, L. Catarinucci, and L. Tarricone, 2013 IEEE MTT-S International Microwave Symposium Digest (MTT), pages 1-4, Seattle, Wash., June 2013, and "An RFID to $I^2C$ Bridge with Supply Interference Reduction for Flexible RFID Sensor Applications," by Tan et al., 2019 IEEE International Conference on RFID (RFID), pages 1-6, Phoenix, Ariz., Apr. 2-4, 2019, the disclosures of which are incorporated by reference herein. The RFID tags and RFID readers may be standard RFID tags and RFID readers that are commercially available. For example, the RFID relay tag may be or include a UHF to $I^2C$ chip that is commercially available (e.g., the UCODE I2C available from NXP) or an NFC to $I^2C$ chip that is commercially available (e.g., the ntagI2C available from NXP). The RFID reader may be, for example, a RAIN standard UHF reader or a NFC standard reader (e.g., standard UHF readers available from Zebra Inc. or Impinj Inc.).

In this example embodiment, the authenticity of the component 114a is based on authentication data that is generated by and accessible to the RoT IC 112a. Likewise, in this example embodiment, the authenticity of the component 114b is based on authentication data that is generated by and accessible to the RoT IC 112b, and the authenticity of the component 114c is based on authentication data that is generated by and accessible to the RoT IC 112c. In other words, RoT 112a may be used to provide authentication data that allows for verification of the component 114a as an authentic component. For example, the RoT IC 112a may generate authentication data based on a unique key generated for authenticating the component 114a. Each of the RoT ICs 112a-112c is associated with a unique identifier (e.g., a serial number) and a unique cryptographic key. The unique identifier and the unique cryptographic key are generated during a trusted manufacturing process and provided to the server 130. The server 130 maintains a RoT IC database 132 of keys and identifiers (e.g., serial numbers) of RoT ICs of managed/to-be-managed electronic devices. The server 130 also maintains an asset/inventory database 134.

The RoT ICs 112a-112c each include a secure and encrypted challenge-response protocol that utilizes the unique cryptographic key. The RoT ICs 112a-112c may each include and/or be communicatively connected to one or more sensors. In an example embodiment, the one or more sensors are capable of measuring one or more conditions, such as temperature, light exposure, vibration, UV radiation, etc. For example, the RoT IC 112a may include a temperature sensor that passively senses and records temperature excursions. The measurements recorded by the temperature sensor may be indicative of potentially malicious behavior. For example, some common integrated circuit counterfeiting techniques would involve the application of heat at a temperature that would be detected by the temperature sensor that is in excess of typical solder reflow temperatures (e.g., temperatures exceeding the Joint Electron Device Engineering Council (JEDEC) standards for solder reflow temperatures. As such, temperatures measurements made by the sensor in response to temperature changes that are in excess of typical reflow profiles may be used to detect unauthorized rework. Additional authentication data may include or be based on sensor readings from sensors of the RoT ICs 112a-112c associated with the corresponding component to be authenticated. The asset management/component authentication server 130 may store the unique IDs and the unique cryptographic keys of the RoT ICs 112a-112c.

In the example embodiment shown in FIG. 1, the RFID relay tag 118 is a passive RFID relay tag that is powered by an RF signal emitted by the RFID reader 120. The RFID reader 120 may use an RF signal to communicate data to the RFID relay tag 118 as well as provide power to the RFID relay tag 118. In turn, the RFID relay tag 118 provides power to the RoT ICs 112a-112c via the wired communication bus 116. The RFID reader 120 powers the RFID relay tag 118 long enough for the RFID relay tag 118 to obtain authentication data to provide to the RFID reader 120.

The RFID reader 120 may communicate with the asset management/component authentication server 130 and the electronic device 110 as part of an asset management/component authentication process. The RFID reader 120 may communicate via RF a query to the RFID relay tag 118 for asset/inventory data of the electronic device 110 and for authentication data of one or more of the components 114a-114c. This query may be referred to as an inventory and authentication request. The RFID relay tag 118 may relay the query via the wired communication bus 116 to one or more of the RoT ICs 112a-112c. The query may be, for example, indicative of a request for RoT ICs 112a-112c (all of the RoT ICs connected to the RFID relay tag 118 via the wired communication bus 116) to provide their respective identifiers to the RFID relay tag. As another example, the query may be indicative of a request for a subset of one or more of RoT ICs 112a-112c to provide their respective identifiers. The RoT ICs that receive the query are configured to provide their respective identifiers via the wired communication bus 116 to the RFID relay tag 118, which then communicates the identifiers via an RF signal to the RFID reader 120. The RFID reader 120 communicates these to the asset management/component authentication server 130, which then uses the identifier as a lookup in its database 132 to obtain the appropriate key to generate an encrypted challenge.

In an example embodiment, the data from these readers may be gathered and organized by a commercial RFID middleware package (e.g., Visi-Trac available from RFID Global Solution Inc.) which is widely used in data center management today, but additional fields and queries would be added to allow for chip level authentication to be executed, for example, upon request.

In an example embodiment, after wafers of RoT ICs are fabricated, each RoT IC on the wafer may be accessed to program its serial number, read its internally derived cryptographic key, and take a baseline reading of any sensors. The serial number, cryptographic key, and sensor measurements can be provided to the asset management/component authentication server 130 for addition to the RoT IC database 132, as part of an enrollment process. For example, the system 101 of FIG. 1B may be used to carry out an enrollment process. As shown, the RoT IC 112a may be probed by the near field probe so that the serial number, cryptographic key, and sensor measurements of the RoT IC 112a can be provided to the server 130. Once the RoT IC 112a is integrated with the component 114a, data that associates the RoT IC 112a with the component 114a may be provided from the RoT IC 112a in the same manner and enrolled in the RoT IC database 132.

Turning back to FIG. 1A, to securely verify authenticity of components of (e.g., contained in) the electronic device 110, the asset management/component authentication server 130 generates an encrypted challenge and verifies an appropriate response is received from the RoT IC 112 via the RFID relay tag 118. After the asset management/component authentication server 130 generates an encrypted challenge, the asset management/component authentication server 130 communicates the encrypted challenge to the RFID reader 120 via the network 145. When the RFID reader 120 and the RFID relay tag 118 are in close enough proximity for RFID-based communication, the RFID reader 120 communicates the encrypted challenge to the RFID relay tag 118 via an RF signal, and the RFID relay tag 118 relays the encrypted challenge via the wired communication bus 116 to the RoT IC that is associated with the component of interest. The distance at which the RFID reader 120 and the RFID relay tag are to be to each other for RFID-based communication may be dependent upon, for example, the frequency of the RF signal used for communication, the type of RFID relay tag used, the type of RFID reader used, among other considerations. The RoT IC 112 communicates a response to the encrypted challenge via the wired communication bus 116 to the RFID relay tag 118, which communicates the response to the RFID reader 120. The RoT IC 112 generates a random number (nonce) as part of each response, so that responses are unique and not repeated. This can be done either with the electronic device 110 in a powered state or an unpowered state. As such, in an example implementation in a datacenter, combined inventory management of servers in the datacenter and authentication of components of these servers may be performed at the server rack level and regardless of whether the server is in a powered or unpowered state. In an example embodiment, the RoT IC 112 is wired only to the RFID relay tag 118 via the wired communication bus 116, and has no electrical connections to any active components of the electronic device 110.

In an example implementation, electronic devices 110 are meant to encompass devices of a data center, a communication network hub, and/or any other infrastructure. The electronic devices 110 may be servers, routers, switches, display devices, storage devices, security appliances, gateways, bridges, access points, etc. In such an implementation, the system 100 provides, for example, visibility of component level authenticity at higher hardware assembly levels, and includes the point of use in the datacenter.

Figure 2:
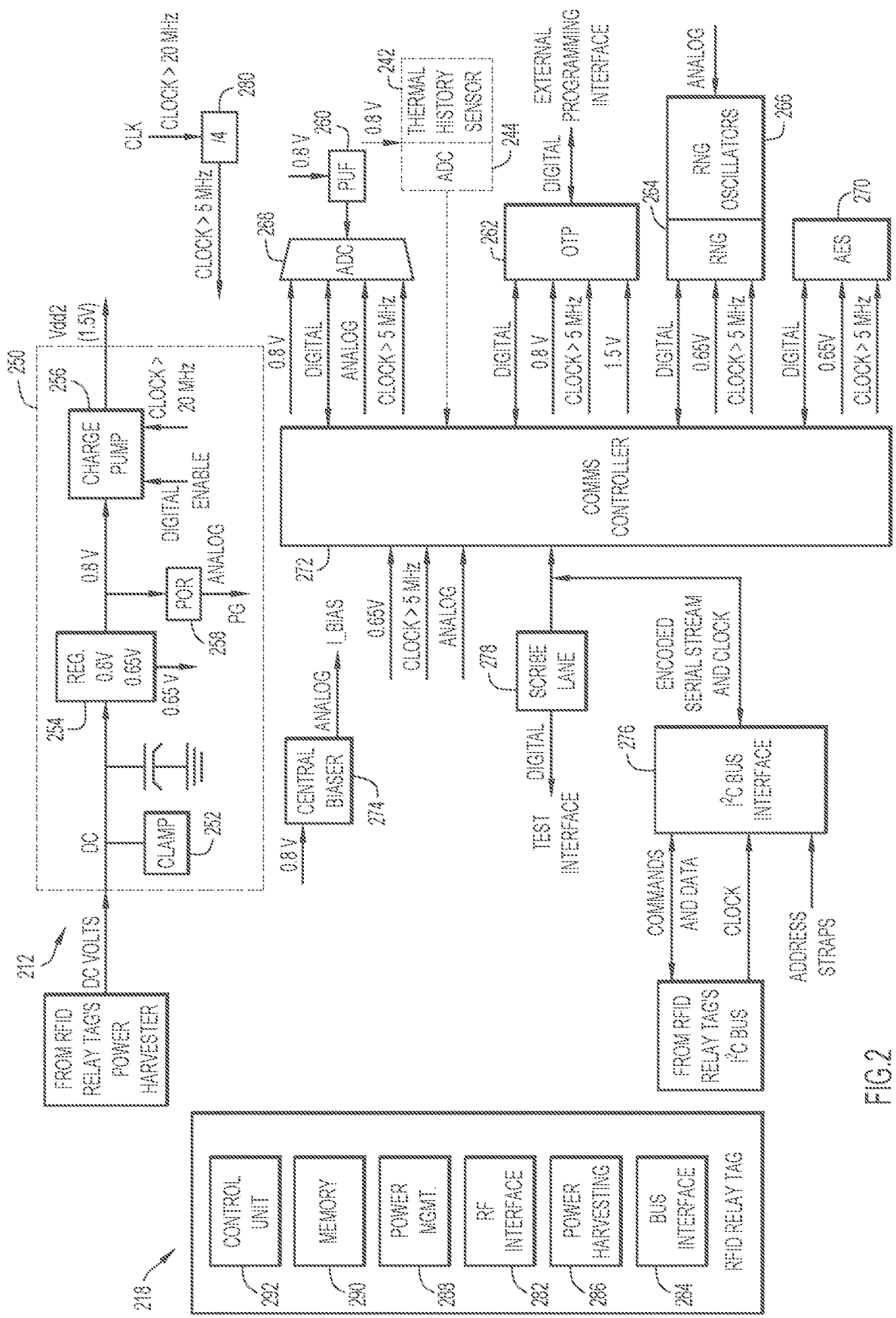
FIG. 2 is a schematic diagram of an example root-of-trust (RoT) integrated circuit (IC) and an example RFID relay tag, according to an example embodiment.

FIG. 2 is a schematic diagram of an example RoT IC 212 and an example RFID relay tag 218, according to an example embodiment. In an example embodiment, the RoT ICs 112a-112c shown in FIGS. 1A and 1B may be configured like RoT IC 212. In an example embodiment, the RFID relay tag 118 shown in FIG. 1A may be configured like RFID relay tag 218. In the example embodiment shown in FIG. 2, the RFID relay tag 218 includes an RF interface 282, a bus interface 284, power harvesting circuitry 286, power management circuitry 288, memory 290, and control unit 292. In an example embodiment, memory 218 includes an electrically erasable programmable read-only memory (EEPROM). Power harvesting circuitry 286 and power management circuitry 288 are for powering the RoT IC 212 during operation. In an example embodiment, for power, there is a direct wired connection to bring voltage across from the power harvesting circuitry 284, and there is also a two wire interface with the data and clock line as required by the I2C standard. A single RFID relay tag is intended to support several RoT ICs wired together within an assembly all powered by and communicating back via the same wires. Each of the RoT ICs has a unique address on the wired communication bus which allow for authentication of each part in turn.

In the example embodiment shown in FIG. 2, the RoT IC 212 includes power circuitry 250 that includes clamp 252, voltage regulator 254, charge pump 256, and power on reset (POR) 258. Voltage (e.g., dc volts) is received from the RFID relay tag 218 via the wired communication bus 116. For example, there may be a direct wired connection from the power harvesting circuitry 286 of the RFID relay tag 218 to the power circuitry 250 of the RoT IC 212. As shown, the voltage regulator 254 receives as an input a first voltage and outputs a second voltage and a third voltage. The voltage regulator 254 provides a stable analog and digital supply voltage. The charge pump 256 powers a one-time programmable (OTP) memory 262 during read mode. An input to the charge pump 256 is an output from the voltage regulator 254. The enable may limit power consumption when the OTP memory 262 is inactive.

As shown in FIG. 2, the RoT IC 112 also includes a physically uncloneable function (PUF) 260 and the one-time programmable (OTP) memory 262. As described above, the RoT IC 212 may include a secure and encrypted challenge response protocol that utilizes on RoT IC key sources. A first key and a second key may be key splits that form parts of a key and the first and second keys may be combined to form a full key. This full key may be known to the asset management/component authentication server 130. For example, the full key may be a unique cryptographic key created and exchanged with the asset management/component authentication server 130 prior to the RoT IC 212 being diced in a secure processing/manufacturing facility. As such, in an example embodiment, the data used to form the unique cryptographic key is extractable from the RoT IC 212 while the RoT IC 212 is in wafer form, and this data is thereafter locked out from extraction.

In the example embodiment shown in FIG. 2, the PUF 260 serves as a source of the first key and the OTP memory 262 serves as a source of the second key. The PUF 260 uses a random process variation inherent in IC fabrication to create a portion of a cryptographic key (e.g., an encryption key). An example PUF that may be used is shown and/or described in "Defeating Counterfeiters With Microscopic Dielets Embedded in Electronic Components" by P. Ralston, et al., Computer, vol. 49, no. 08, pp. 18-26, IEEE Computer Society 2016, the disclosure of which is incorporated by reference herein. In an example embodiment, each of the first and second key sources provides 256 bits of high entropy data for encryption. Because the PUF 260 is uniquely created and born with each chip, it is practically impossible to duplicate or clone the RoT IC 212. The OTP memory 262 stores a custom ID for the RoT IC 212 and random data for a component of the encryption key. For example, the OTP memory 262 may protect a 64-bit serial number (SN) and a 256-bit key from exploitation. An example OTP memory that may be used is shown and/or described in "Defeating Counterfeiters With Microscopic Dielets Embedded in Electronic Components" by P. Ralston, et al., Computer, vol. 49, no. 08, pp. 18-26, IEEE Computer Society, 2016.

The RoT IC 212 further includes a random number generator (RNG) 264, RNG oscillators 266, an analog-to-digital converter (ADC) 268, an encryption engine 270, a communications controller 272, a central biaser 274, a bus interface 276, scribe lane 278, and a divide-by-4 clock 280.

In an embodiment, the encryption engine 270 includes an Advanced Encryption Standard (AES) encryption engine, with half the key programmed into nonvolatile memory at wafer probe, the PUF 260 key read, and the complete key information enrolled with the server 130. A challenge-response protocol may be employed to enable secure RoT IC authentication.

The RoT IC 212 has a serial number (SN) that is stored on the OTP memory 262. The SN may be an index that the server uses to look up the key corresponding to the SN in the database 132. The server 130 generates an encrypted random challenge question which is provided to the RFID reader which provides it to the RFID relay tag. The RFID relay tag 118 then provides it to the RoT IC 212. If the chip successfully decrypts and authenticates the challenge, the chip collects its passive sensor readings and sends them back to the server 130 in an encrypted response. If the server 130 successfully decrypts and authenticates the response, it updates its database with the most recent chip information and provides a success status to the RFID reader 120.

The RoT IC 212 is shown in FIG. 2 as including a thermal history sensor 242 and an ADC 244. In an example embodiment, the RoT IC 112 neither includes nor is configured to communicate with the thermal history sensor 242 and the ADC 244.

Figure 3:
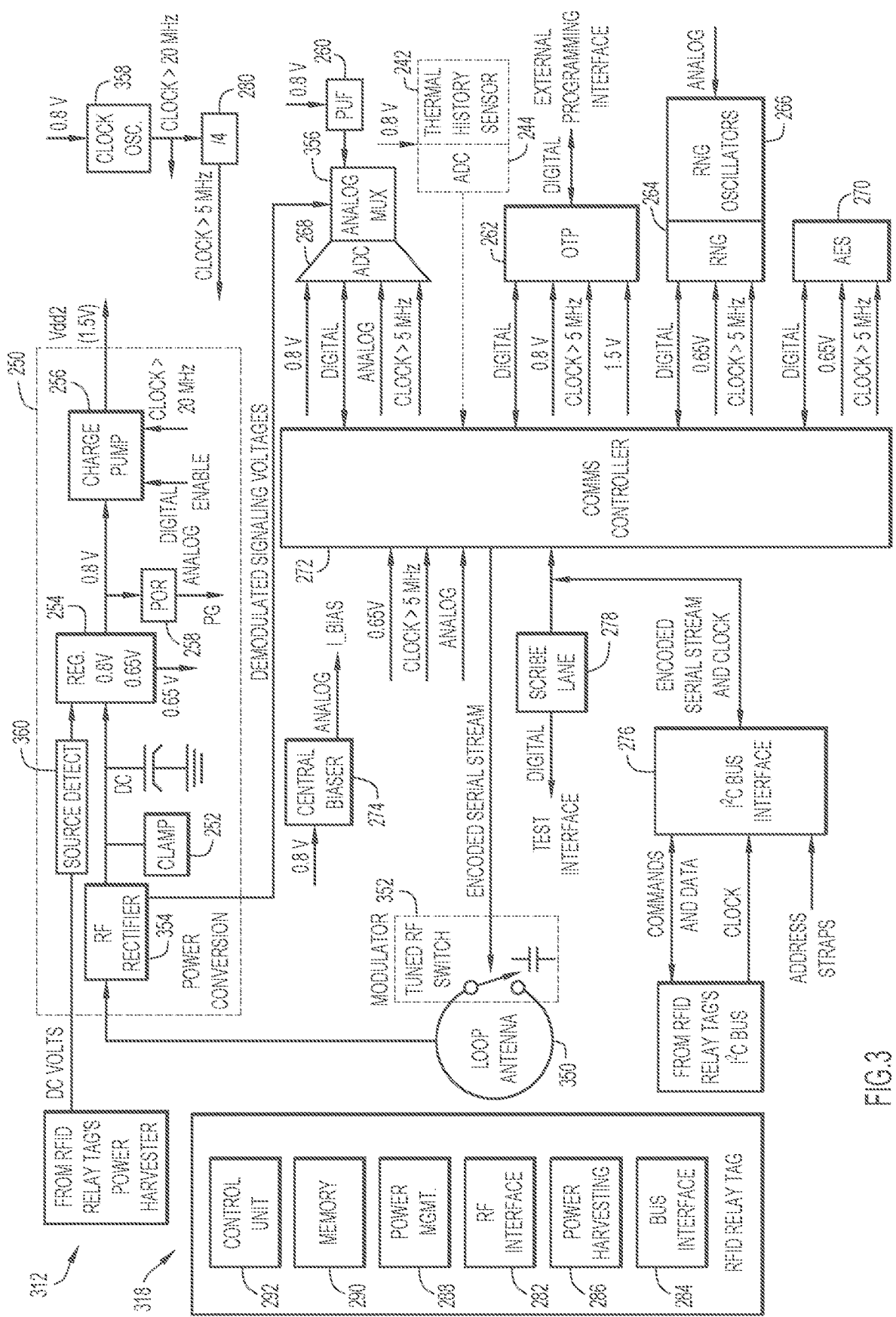
FIG. 3 is a schematic diagram of an example RoT IC including radio frequency (RF) communication capability and an example RFID relay tag, according to an example embodiment.

Turning now to FIG. 3, shown is a schematic diagram of an example RoT IC 312 including local RF communication capability and the RFID relay tag 218, according to an example embodiment. In an example embodiment, the RoT ICs 112a-112c in FIGS. 1A and 1B may be configured like RoT IC 312. As shown, the RoT IC 312 includes many of the same elements as the RoT IC 212 as described above in relation to FIG. 2, and additionally includes loop antenna 350, modulator 352, RF rectifier 354, and analog mux 356, clock oscillator 358, and source detect 360, at least some of which may be configured to operate as described in "DARPA SHIELD Improves Supply Chain Traceability and Deters Counterfeiting" by Scott Suko, RFID Journal Live! 14th Annual Conference and Exhibition, pages 1-21, May 3-5, 2016, the disclosure of which is incorporated by reference herein.

In the example embodiment shown in FIG. 3, two modes of RoT IC data access may be employed for use in different stages of product lifecycle. For example, in a first mode of operation (stand alone RF mode), the RoT IC is accessed via a microwave frequency near field magnetic link, coupling power and data to circuitry on the RoT IC and executing a challenge response protocol for authentication, communicating with a probe held nearby. In a second mode of operation (access via wired authentication bus), there is a wired link between the RoT IC and an RFID relay chip that will allow for authentication at longer range using industry standard RFID techniques, for example, at either UHF or HF depending upon the RFID relay tag selected. The RFID relay tag serves both all the asset management functions, and as a pass through link to the RoT IC.

Figure 4:
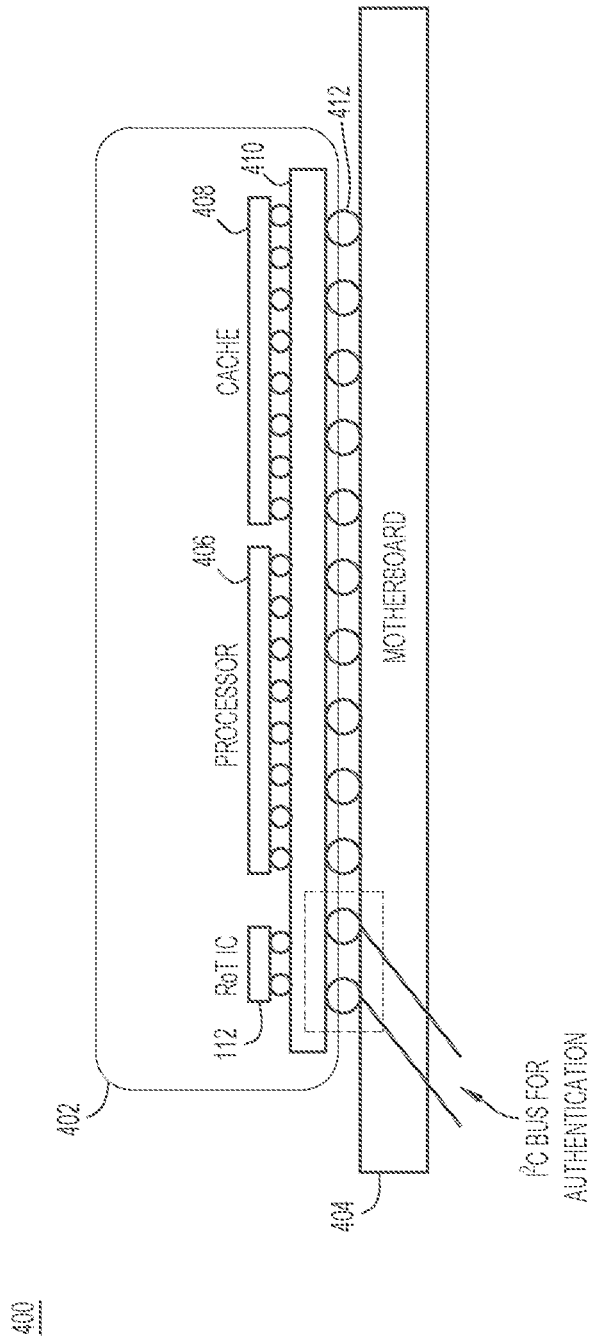
FIG. 4 is a diagram illustrating an example packaging of the RoT IC with components of an electronic device, according to an example embodiment.
Figure 5:
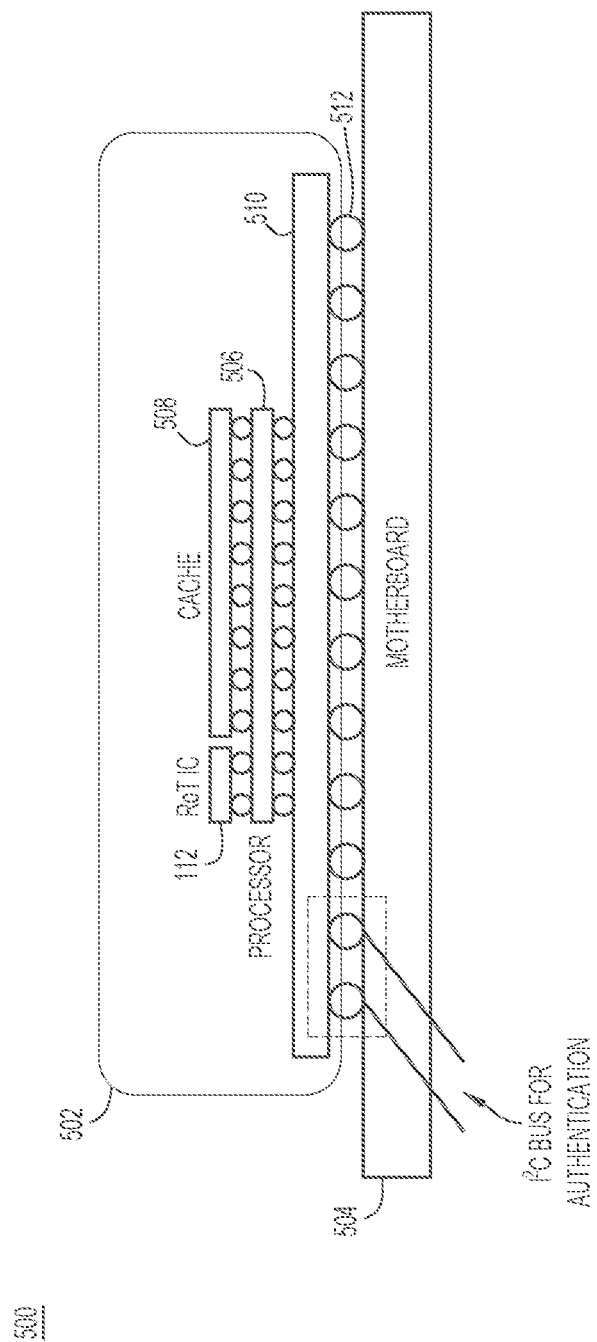
FIG. 5 is a diagram illustrating another example packaging of the RoT IC with components of an electronic device, according to an example embodiment.
Figure 6:
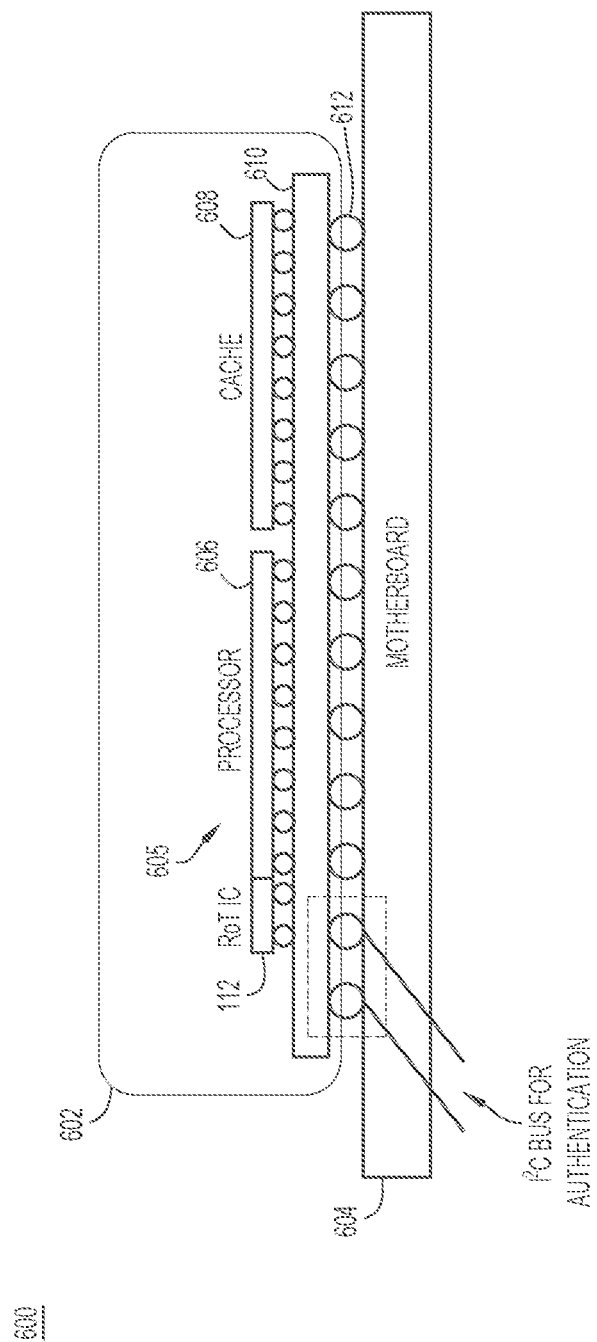
FIG. 6 is a diagram illustrating yet another example packaging of the RoT IC with components of an electronic device, according to an example embodiment.

Turning now to FIGS. 4-6, shown are three different example physical implementations of the RoT IC 112. The RoT IC 112 can be built-in at the IC level and/or the package level. For example, the RoT IC 112 may be included as a portion of an application specific integrated circuit (ASIC).

FIG. 4 is a diagram illustrating an example electronic package 400 of an electronic device (e.g., electronic device 110), according to an example embodiment. The electronic package 400 includes an IC package 402 and a circuit board 404. The IC package 402 includes the RoT IC 112, a processor 406, a cache 408, and a package substrate 410 (e.g., a ball grid array (BGA) substrate, an interposer, etc.). In the example embodiment shown in FIG. 4, the RoT IC 112 is a stand-alone chip that is packaged with other chips (the processor 406 and the cache 408). Each of these chips is connected to the package substrate 410, which is connected or mounted to the circuit board 404, for example, by solder balls 412. As shown, connections exist between the wired communication bus 116 and the RoT IC 112, however, no connections exist between the wired communication bus 116 and the processor 406 and the cache 408. In some embodiments, no connections are needed between the wired communication bus 116 and any active digital hardware of the IC package 402.

FIG. 5 is a diagram illustrating an example electronic package 500 of an electronic device (e.g., electronic device 110), according to an example embodiment. The electronic package 500 includes an IC package 502 and a circuit board 504. The IC package 502 may be considered to be a 3-D stack type packaging. The IC package 502 includes the RoT IC 112, a processor 506, a cache 508, and a package substrate 510. In the example embodiment shown in FIG. 5, the RoT IC 112 is a stand-alone chip that is packaged on top of another chip (the processor 506) and that uses through-chip vias that pass through the processor 506 to establish a communication path over the wired communication bus 116. The cache 508 is also packaged on top of the processor 506, which is connected to the package substrate 510. The package substrate 510 is connected or mounted to the circuit board 404, for example, by solder balls 512.

FIG. 6 is a diagram illustrating an example electronic package 600 of an electronic device (e.g., electronic device 110), according to an example embodiment. The electronic package 600 includes an IC package 602 and a circuit board 604. The IC package 602 includes an electronic component 605, cache 608, and package substrate 610. The electronic component 605 includes RoT IC 112 and processor 606. As such, in the IC package 602, unlike in the IC packages 402 and 502 in which the RoT IC 112 is a stand-alone chip, the RoT IC 112 forms part of the same IC of the processor 606. The electronic component 605 and the cache 608 are connected to the package substrate 610, which is connected or mounted to the circuit board 604, for example, by solder balls 612. The electronic component 605 is constructed in such a way that the RoT IC 112 is powered separately from the processor 606.

In FIGS. 4-6, the RoT IC 112 is packaged with or integrated with known/good authentic die, and the RoT IC 112 would mark the IC packages 402, 502 and 602 as authentic. As described above, the RoT IC 112 may include a sensor (e.g., a thermal history sensor) to detect tampering. For example, tampering would be noted by the temperature history sensor indicating an additional unexpected elevated temperatures. The thermal sensor may be polled after IC package assembly as well as after circuit board assembly, so reworking, replacement, or other modifications of packaged chips could be detected. In another example embodiment, the RoT IC may be embedded in a board or other type of electronic package.

Figure 7:
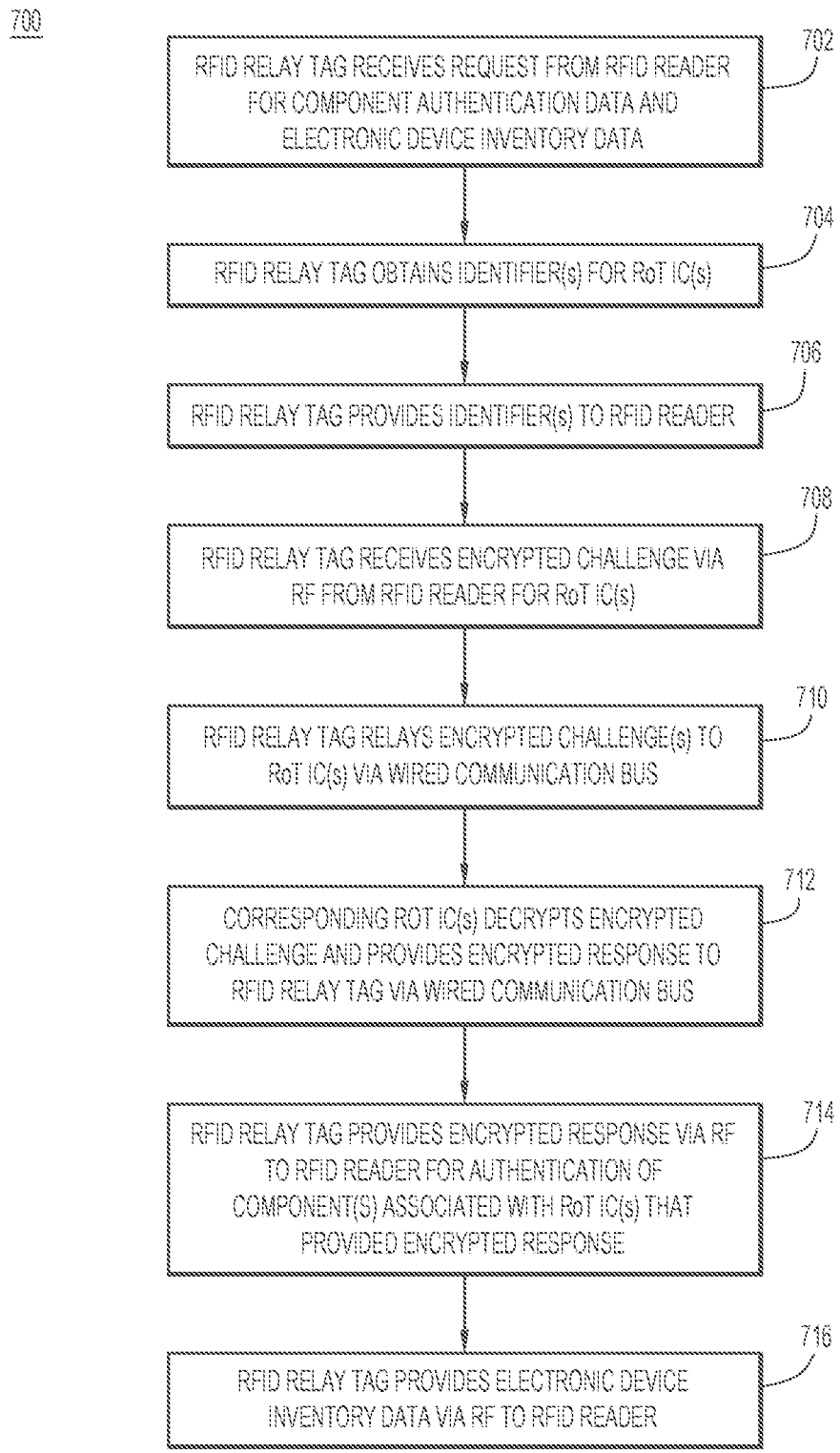
FIG. 7 is a flowchart of a method of combined radio frequency identification (RFID)-based asset management and component authentication, according to an example embodiment.

FIG. 7 is a flowchart of a method 700, according to an example embodiment. At 702, an RFID relay tag (e.g., the RFID relay tag 118 as described above) associated with an electronic device (e.g., the electronic device 110 as described above) receives from an RFID reader (e.g., the RFID reader 120 as described above) a request for component authentication data and electronic device inventory data. In an example embodiment, the request may be for component authentication data corresponding to a plurality of components of the electronic device (e.g., the components 114a-114c as described above) that is provided by one or more RoT ICs (e.g., one or more RoT ICs 112a-112c as described above) associated with a corresponding one of the components, and inventory data corresponding to the electronic device.

At 704, the RFID relay tag obtains an identifier (e.g., a serial number) for each of the one or more RoT ICs. In an example embodiment, the identifier is a serial number that uniquely identifies a RoT IC. The identifier may be assigned to the RoT IC by a trusted In an example embodiment, an identifier for a RoT IC may be stored at the RoT IC (e.g., stored in an onboard memory of the RoT IC, such as the OTP memory 214 or the OTP memory 314 as described above), and the RoT IC may provide the RFID relay tag with the identifier in response to the RoT IC receiving from the RFID relay tag a message indicative of a request (query) for the identifier of the RoT IC. In another example embodiment, an identifier for a RoT IC may be stored at the RFID relay tag (e.g., stored in an onboard memory of the RFID relay tag), and the RFID relay tag may obtain the identifier from the RoT IC, which may have previously provided the identifier to the RFID relay tag for storage at the RFID relay tag. In an example embodiment, the RFID relay tag may obtain the identifier prior to the RFID relay tag receiving the request, at the same time the RFID relay tag receives the request, and/or subsequent to the RFID relay tag receiving the request. In response to receiving the request, the RFID relay tag may query all of the RoT ICs connected to the wired communication bus for their respective identifiers, or may query a particular subset of all of the RoT ICs connected to the wired communication bus for their respective identifiers.

At 706, the RFID relay tag provides the identifier to the RFID reader. In an example embodiment, the RFID relay tag provides the identifier to the RFID reader via an RF signal. The RFID reader may then provide the identifier to a server (e.g., the asset management/component authentication server 130 as described above), which may obtain a cryptographic key based on the identifier. For example, the server may perform a database look up using the identifier to obtain a cryptographic key stored in the database in relation to the identifier. If the cryptographic key corresponding to the identifier is found, then the server may generate an encrypted random challenge using both the stored keys and a random number that was provided by the RoT IC, to which the RoT IC calculates a response based upon its stored keys. The server, on the basis of the RoT IC's response, is able to validate that this is an authentic part.

At 708, the RFID relay tag receives an encrypted challenge via an RF signal from the RFID reader for each of the one or more RoT ICs. The RFID reader may receive the encrypted challenge from the server via a network, and the RFID reader then may forward the encrypted challenge to the RFID relay tag via RF.

At 710, the RFID relay tag relays the encrypted challenge(s) to the corresponding RoT IC(s) via a wired communication bus (e.g., the wired communication bus 116 as described above). In an example embodiment, an encrypted challenge message may be associated with an address of the RoT IC so that when the RFID relay tag receives the encrypted challenge message, the RFID relay tag is able to relay the message to the appropriate address.

At 712, the corresponding RoT IC(s) decrypts the encrypted challenge and provides an encrypted response to the RFID relay tag via the wired communication bus. If the RoT IC is not able to decrypt the encrypted challenge, the server may respond by noting an authentication failure.

At 714, the RFID relay tag provides the encrypted response received from the RoT IC via RF to the RFID reader for authentication of component(s) associated with the RoT IC(s) that provided the encrypted response. The encrypted response may include sensor readings (e.g., taken within a predetermined amount of time). In an example embodiment, the RFID reader may determine from the encrypted response received from the RFID relay tag whether the RoT IC is authentic. In another example embodiment, the RFID reader may forward the encrypted response to a server (e.g., the server 130 described above), and the server may determine whether the RoT IC is authentic. If the RoT IC is determined not to be authentic, a notification that indicates that the RoT IC is not authentic may be displayed. For example, the RFID reader may receive from the server a notification that indicates that the RoT IC is not authentic, and in response to receiving the notification, the RFID reader may display the notification. If the RoT IC is determined to be authentic, a notification that indicates that the RoT IC is authentic may be displayed. For example, the RFID reader may receive from the server a notification that indicates that the RoT IC is authentic, and in response to receiving the notification, the RFID reader may display the notification. Electronic device inventory data may be displayed in conjunction with a notification that the RoT IC is or is not authentic.

At 716, the RFID relay tag provides electronic device inventory data via RF to the RFID reader. In an example embodiment, the RFID relay tag may provide the electronic device inventory data to the RFID reader at the same time that the RFID relay tag provides the encrypted response to the RFID reader. In an example embodiment, the RFID relay tag, which includes a rewriteable memory, may provide the electronic device inventory data to the RFID reader prior to and/or subsequent to the time that the RFID relay tag provides the encrypted response to the RFID reader. All the conventional inventory information one would normally derive from a tagged asset, such as status, location, time and place of prior reads may be written to the commercial RFID relay tag as it includes all the features of other UHF inventory tags.

In an example embodiment, the inventory data may be stored at the RFID relay tag (e.g., on an onboard memory of the RFID relay tag). The inventory data may include metadata of the electronic device, an identifier (e.g., serial number) of the electronic device, a status of the electronic device, and time and place of recent prior reads, any other suitable inventory data corresponding to the electronic device. The identifier may identify the electronic device from other electronic devices that are managed as part of an inventory management system.

FIG. 8 illustrates a hardware block diagram of a computing device 800 that may perform the functions of any of the servers or computing or control entities referred to herein in connection with FIGS. 1-7. It should be appreciated that FIG. 8 provides only an illustration of one embodiment and does not imply any limitations with regard to the environments in which different embodiments may be implemented. Many modifications to the depicted environment may be made. nd most likely would be acloud hosted database program that specifically stores As depicted, the device 800 includes a bus 812, which provides communications between computer processor(s) 614, memory 616, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for the "Control Logic" may be stored in memory 816 or memory 818 for execution by processor(s) 814.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards. Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to authentication of RoT ICs, tampering of components, inventory of electronic devices), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus comprising:
a plurality of components to be authenticated;
a memory configured to store inventory data;
a plurality of root-of-trust (RoT) integrated circuits (ICs), each mechanically coupled to a corresponding one of the plurality of components, and each configured to generate authentication data based on a unique key generated for authenticating the corresponding component;
a wired communication bus; and
a radio frequency identification (RFID) relay tag connected to each of the RoT ICs via the wired communication bus, wherein the RFID relay tag is configured to communicate with each of the RoT ICs via the wired communication bus and pass the authentication data of each of the plurality of RoT ICs and the inventory data to an RFID reader via a radio frequency signal to facilitate authentication of the plurality of components and inventory management.

2. The apparatus of claim 1, wherein the communication bus is an inter-integrated circuit ($I^2C$) bus.

3. The apparatus of claim 1, wherein the RFID relay tag is configured to receive an inventory and authentication request from the RFID reader and communicate an authentication query based on the inventory and authentication query to one or more of the RoT ICs via the wired communication bus.

4. The apparatus of claim 3, wherein the RFID relay tag is configured to obtain the inventory data from the memory in response to receiving the inventory and authentication request from the RFID reader.

5. The apparatus of claim 1, wherein each of the components is packaged in an integrated circuit package with a corresponding one of the RoT ICs.

6. The apparatus of claim 5, wherein at least one of the integrated circuit packages includes a connection between the wired communication bus and the corresponding RoT IC.

7. The apparatus of claim 1, wherein the unique key is a cryptographic key that has previously been shared with an asset management/component authentication server.

8. The apparatus of claim 1, wherein each of the RoT ICs includes a first key source and a second key source that are combinable to form the unique key.

9. The apparatus of claim 8, wherein the first key source is a physically uncloneable function and the second key source is a one-time programmable memory.

10. The apparatus of claim 1, wherein a first one of the plurality of RoT ICs includes a radio frequency interface for direct wireless authentication of the RoT IC and corresponding component prior to assembly of the RoT IC in an electronic package.

11. The apparatus of claim 1, wherein each of the root-of-trust integrated circuits is configured to store a unique identifier.

12. A method comprising:
receiving by a radio frequency identification (RFID) relay tag of an electronic device a request to an RFID reader for component authentication and electronic device management data, wherein a component of the electronic device is packaged with a root-of-trust (RoT) integrated circuit (IC) that is connected to the RFID relay tag via a wired communication bus;
receiving by the RFID relay tag from the RFID reader via a first RF signal an encrypted challenge for the RoT IC;
providing by the RFID relay tag via the wired communication bus the encrypted challenge to the RoT IC;
receiving by the RFID relay tag from the RoT IC via the wired communication bus an encrypted response generated by the RoT IC;
providing the encrypted response via a second RF signal to the RFID reader for authentication; and
providing electronic device management data to the RFID reader for electronic device management.

13. The method of claim 12, further comprising decrypting the encrypted challenge with a cryptographic key stored on the RoT IC.

14. The method of claim 13, further comprising generating the cryptographic key from first and second keys from first and second key sources.

15. The method of claim 14, wherein the first key source is a physically uncloneable function and the second key source is a one-time programmable memory.

16. The method of claim 13, further comprising providing the cryptographic key to an asset management/component authentication server prior to receiving the encrypted challenge.

17. The method of claim 12, wherein the component is packaged in an integrated circuit package with the RoT IC.

18. The method of claim 12, further comprising providing via RF to the RFID reader a unique identifier for the RoT IC.

19. The method of claim 18, further comprising obtaining the unique identifier for a corresponding RoT IC in response to the request from an RFID reader for authentication data and inventory data.

20. The method of claim 12, further comprising authenticating the RoT IC via an RF interface of the RoT IC prior to assembly of the RoT IC in an electronic package.

21. A method comprising:
storing inventory data of a plurality of components, each component mechanically coupled to a corresponding root-of-trust (RoT) integrated circuit (IC) in a plurality of RoT ICs;
receiving authentication data over a wired communication bus from the plurality of RoT ICs, the authentication data based on unique keys associated with the plurality of RoT ICs and generated for authenticating the plurality of components associated with the plurality of RoT ICs; and
wirelessly relaying the inventory data and the authentication data from each of the plurality of RoT ICs to a radio frequency identification (RFID) reader via a radio signal to facilitate authentication of the plurality of components and inventory management.

* * * * *